United States Patent [19]
Harkness

[11] 3,874,551
[45] Apr. 1, 1975

[54] ALTERNATOR ELECTRICAL SYSTEM FOR BATTERY CHARGING AND LOAD ENERGIZATION

[75] Inventor: Joseph R. Harkness, Germantown, Wis.

[73] Assignee: Briggs & Stratton Corporation, Wauwatosa, Wis.

[22] Filed: Oct. 15, 1973

[21] Appl. No.: 406,681

Related U.S. Application Data
[63] Continuation of Ser. No. 229,891, Feb. 28, 1972.

[52] U.S. Cl. ............... 320/39, 320/57, 322/28, 322/90
[51] Int. Cl. ............... H02j 7/13, H02p 9/00
[58] Field of Search ..... 320/6, 7, 12, 39, 40, 57–59, 320/61, 64, 68, DIG. 2, 60; 307/11–13; 322/28, 90, 94; 310/70

[56] References Cited
UNITED STATES PATENTS

| | | | |
|---|---|---|---|
| 1,745,841 | 2/1930 | Bradbury | 320/15 X |
| 3,256,474 | 6/1966 | Englund, Jr. | 320/16 X |
| 3,329,881 | 7/1967 | Tolmie | 320/2 |
| 3,671,851 | 6/1972 | Harkness | 320/68 X |
| 3,760,259 | 9/1973 | Tharman | 320/60 X |
| 3,808,514 | 4/1974 | Wesemeyer | 320/59 X |

FOREIGN PATENTS OR APPLICATIONS

| | | | |
|---|---|---|---|
| 853,854 | 10/1970 | Canada | 320/6 |
| 708,428 | 4/1931 | France | 320/59 |

*Primary Examiner*—J. D. Miller
*Assistant Examiner*—Robert J. Hickey

[57] ABSTRACT

A single winding in which an a.c. can flow has its ungrounded terminal connectable through a first rectifier with a load circuit and through a second rectifier with a storage battery. The load circuit is energized by half cycles of one polarity of the a.c., the battery is charged by the other half cycles. The second rectifier is preferably an SCR having its gate connected with a regulator circuit comprising a resistor in series with a zener diode. A double-throw switch permits energization of the load from the winding, when current flows in it, or otherwise from the battery.

6 Claims, 1 Drawing Figure

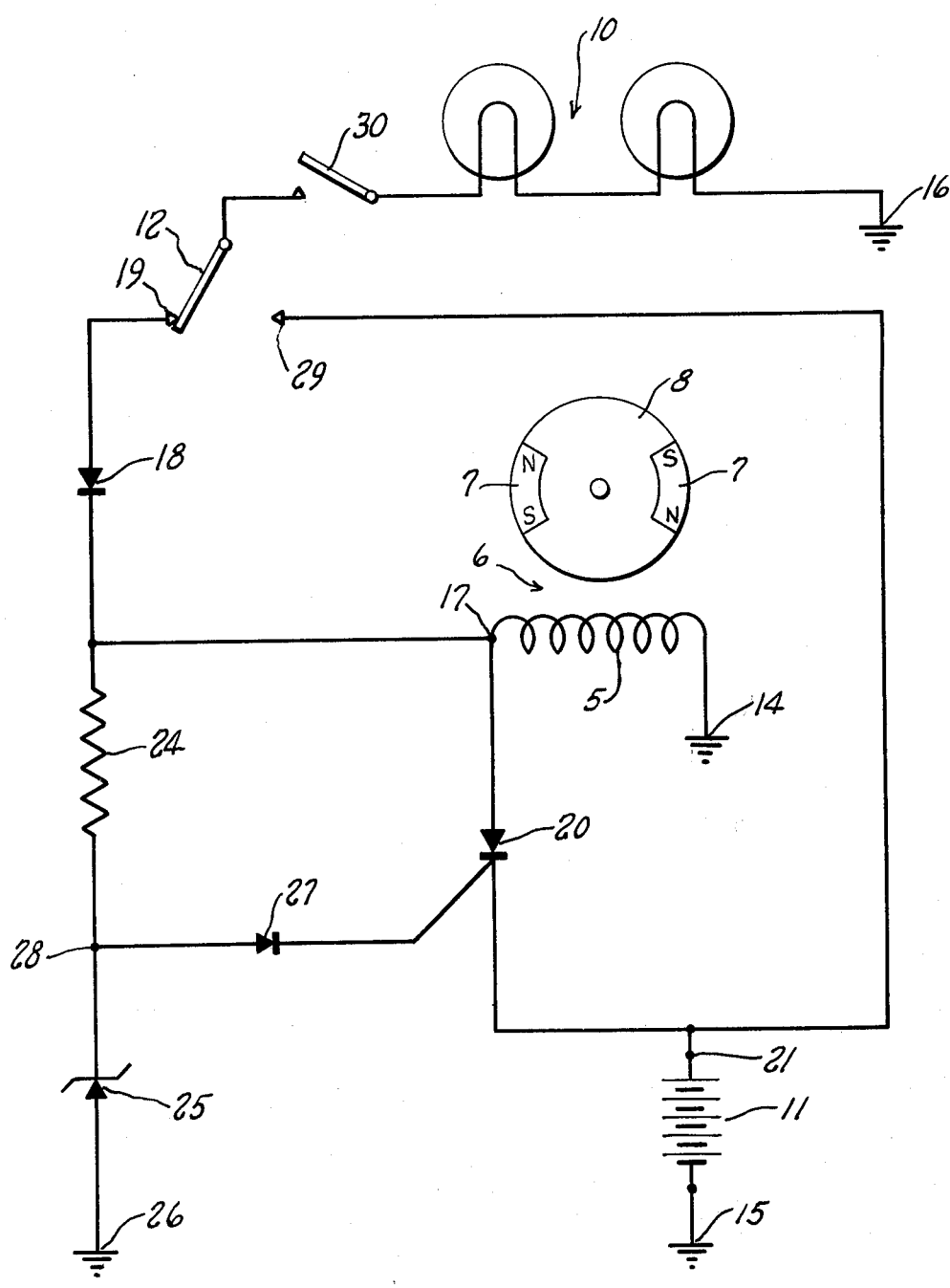

ALTERNATOR ELECTRICAL SYSTEM FOR BATTERY CHARGING AND LOAD ENERGIZATION

This application is a continuation of my copending application Ser. No. 229,891, filed Feb. 28, 1972.

This invention relates to electrical systems that comprise an alternating current source, a storage battery to be charged from the a.c. source when current is available from it, and a load that can be energized either from the a.c. source or from the battery; and the invention is more particularly concerned with an improved electrical system of that character which is especially well suited for machines such as riding tractors that are powered by single-cylinder gasoline engines.

Small riding tractors now extensively used for lawn mowing, snow plowing and similar yard and estate tasks, are being increasingly equipped with electrical systems that provide for engine starting and for energization of headlights and other auxiliary equipment. An alternator that is driven by the engine serves as the primal current source, and a storage battery that is charged from the alternator energizes the electrical accessories when the engine is not running. The electrical system of such a machine must permit the headlights or other load circuit to be energized simultaneously with charging of the battery of times when the engine is running, and must insure that at such times there is no interference between battery charging and load circuit energization. Moreover, it must provide for rectification of the battery charging current and for regulation of it in accordance with the condition of the battery.

Heretofore it has been necessary to employ more or less complicated and expensive voltage regulator apparatus to permit a storage battery to be charged from an alternator simultaneously with energization of another load from the same alternator. The cost and complexity of such voltage regulator apparatus was in conflict with other requirements for an electrical system of the character described that is suitable for a machine powered by a single-cylinder engine. Any such system must be compact, should comprise few and simple components connected and arranged in a manner to assure dependable operation without the need for maintenance and under substantially adverse conditions, but withal, should be low in cost.

The present invention has as its general object to provide an electrical system that meets all of these requirements to an unprecedented extent.

Another and more specific object of this invention is to provide an electrical system of the character described that comprises a very compact and inexpensive alternator that is nicely adapted for cooperation with magnets carried by the flywheel of a single-cylinder engine, rectifier and voltage regulator means by which a battery can be charged from the alternator when the engine is operating, and means for energizing an electrical load circuit from the alternator when the engine is running and from the battery when the engine is stopped, which system comprises a minimal number of inexpensive components connected in a simple circuit that insures against inadvertent discharge of the battery when the engine is stopped.

It is another specific object of this invention to provide an electrical system of the character described having as its primal current source a single winding in which an a.c. is induced, and wherein that winding functions in a novel manner to provide for both load circuit energization and regulated battery charging.

With these observations and objectives in mind, the manner in which the invention achieves its purpose will be appreciated from the following description and the accompanying drawing, which exemplifies the invention, it being understood that changes may be made in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and in which The single FIGURE is a circuit diagram of an electrical system embodying the invention.

Referring now to the accompanying drawing, the numeral 5 designates a single winding in which an alternating current is intended to be induced. The winding 5 is here illustrated as that of an alternator 6 that also comprises one or more permanent magnets 7 which are carried by a gasoline engine flywheel 8 for orbital motion in flux linking relation with the winding.

It is recognized that the mounting of alternator magnets on a small engine flywheel is a conventional expedient that makes for compactness in a machine comprising a single-cylinder engine and an alternator, but the present invention not only makes possible the utmost compactness in such an alternator but simplifies the attainment of compactness while at the same time achieving great simplicity and minimal cost, all by reason of the fact that the invention contemplates an alternator having only one winding which has a novel cooperation with other circuit components whereby it can very efficiently perform two different functions.

The electrical system of this invention for which the winding 5 serves as a primal current source also comprises a load circuit 10 here illustrated as a pair of series-connected headlights, a storage battery 11 that provides for energization of the load circuit at times when the flywheel 8 is not rotating to induce current in the winding, and a single-pole double-throw switch 12 that enables the load circuit to be selectively connected with either the winding 5 or the battery 11.

As is conventional, one terminal of the winding 5 is grounded, as at 14; the battery 11 has one of its terminals grounded, as at 15; and the load circuit likewise has a grounded terminal, as at 16.

A diode rectifier 18 has a series connection with the ungrounded terminal 17 of the winding 5 and with one selectable contact 19 of the double-throw switch 12. That switch has its movable contactor connected with the load circuit, and when it is in its position illustrated, the rectifier 18 provides for energization of the load circuit with current of one polarity that flows in the winding during engine operation.

Current of the opposite polarity is employed for battery charging, and to that end another rectifier 20 is connected between the ungrounded terminal 17 of the winding and the ungrounded terminal 21 of the battery. For regulation of battery charging current, the rectifier 20 can be an SCR having its gate connected with a regulator circuit comprising a resistor 24 and a zener diode 25 that are connected in series with one another.

The regulator circuit is connected in parallel with the circuit comprising the battery and the SCR, and thus the resistor 24 is connected between the ungrounded terminal 17 of the winding and the zener diode 25, and the zener diode is grounded, as at 26. A diode 27 is connected between the gate of the SCR and the connection 28 between the resistor and the zener diode. The diode 27 is arranged to pass current of the same polarity that is used for battery charging.

The resistor and the zener diode cooperate to maintain a substantially constant maximum potential at the gate of the SCR, which maximum potential is approximately equal to the fully charged voltage of the battery, and is determined by the voltage at which the zener diode begins to conduct in its back direction. When the battery is up to its full charge, practically no current flows in the winding 5 during the battery charging half-cycles of the alternating current induced in it, since the SCR is in blocking condition. At such times, therefore, the alternator 6, during those half-cycles, takes practically no power from the engine that drives it. If the battery is not up to full charge, the SCR will be gated on during at least a portion of each battery charging half-cycle, to pass charging current to the battery. The point in each such half-cycle at which the SCR becomes conductive will depend upon the voltage across the battery. At the beginning of the next half-cycle of opposite polarity the SCR will of course be switched off by the back voltage across it.

If the load circuit 10 is to be energized at a time when the engine is not running, the double-throw switch 12 is moved to its position in which its contactor is engaged with a selectable contact 29 that is connected with the ungrounded battery terminal 21, thus providing for energization of the load circuit from the battery.

If the double-throw switch were to be left in this "battery" position at a time when the engine was running, the load circuit would be energized only during the battery charging half-cycles of a.c., and its use would interfere with proper battery charging. For this reason the double-throw switch 12 is preferably ganged with an ignition switch for the engine, so that its position is always the correct one for energization of the load circuit from the appropriate source. A single-pole single-throw switch 30 is the load circuit, in series with the double-throw switch, permits the load circuit to be turned off at times when it is not needed. If the separate switch 30 were not desired, the double throw switch 12 could obviously be provided with a defined "off" position in which it would connect the load circuit with neither the battery nor the winding.

It will be observed that when the engine is not in operation there is no possibility of the battery being drained through the winding 5 because the battery imposes a back voltage upon the SCR 20 that keeps the latter nonconductive.

From the foregoing description taken with the accompanying drawing it will be apparent that this invention provides an electrical system comprising an alternator, a battery, and a load that can be energized from either the alternator or the battery, which electrical system is particularly well adapted for small gasoline engine installations by reason of its compactness and low cost and because of the further reason that it draws power from the engine only when and to the extent that such power is actually needed for energization of the load and for regulated charging of the battery.

Those skilled in the art will appreciate that the invention can be embodied in forms other than as herein disclosed for purposes of illustration.

The invention is defined by the following claims:

1. Means for energizing an electrical load and for simultaneously charging a battery that can serve as an alternate source of energization for the load, said means comprising:

A. a winding in which an alternating current can be induced;
   B. means for inducing an alternating current in the winding;
   C. first half-wave rectifier means connectable in series circuit with the entire winding and the load for energizing the load with half-cycles of current of one polarity that are induced in the whole winding, and arranged to prevent current of the opposite polarity from flowing to the load;
   D. second half-wave rectifier means so connected in series with the battery and the entire winding as to provide for charging the battery with current of said opposite polarity that is induced in the whole winding and to prevent current of said one polarity from flowing to the battery; and
   E. voltage regulator means operatively connected in a circuit with said second rectifier means and the battery for controlling current flow to the battery in accordance with the voltage across the battery terminals.

2. The apparatus of claim 1, further characterized by:
   F. said second rectifier means comprising a controlled rectifier having a gate; and
   G. said voltage regulator means comprising
      1. a resistor,
      2. a zener diode, and
      3. means connecting said resistor and the zener diode in series with the winding in a regulating circuit which is in shunt with the circuit comprising the battery and the controlled rectifier, and providing a connection common to the resistor, the zener diode and the gate of the controlled rectifier, said regulating circuit providing for maintenance of a substantially constant potential at said connection whenever voltage of said opposite polarity exceeds the voltage at which said zener diode begins to conduct in its back direction.

3. An electrical system for a machine which is powered by a prime mover and which has an electrical load with a pair of terminals and a battery with a pair of terminals from which the load can be energized at times when the prime mover is not operating, said electrical system comprising:

A. an alternator comprising
      1. a winding having a pair of terminals, one of which is connected with a terminal of the battery and a terminal of the load, and
      2. means driven by the prime mover for inducing in the winding an alternating current;
   B. means comprising a controlled rectifier having a gate, said rectifier being connected between the other terminal of the winding and the other terminal of the battery for passing to the battery, at times when the battery needs charging, current of one polarity that is induced in the winding;
   C. voltage regulator means connected with said other terminal of the winding and the first mentioned terminal of the battery, and having a connection with said gate, for controlling said controlled rectifier means in accordance with the condition of the battery;

D. other rectifier means connected with said other terminal of the winding and arranged to pass current of the other polarity that is induced in the winding; and E. two position switch means having a common terminal that is connected with the other terminal of the load and having a pair of alternatively selectable terminals,
   1. one of which is connected with said other rectifier means to provide for energizing the load with current of said other polarity that is induced in the winding when the prime mover is operating, and
   2. the other of which is connected with said other terminal of the battery for energizing the load from the battery when the prime mover is not operating.

4. An electrical system of the type that comprises a source of alternating current which is available only at certain times, a load having a pair of terminals and which must be energized both at times when alternating current from said source is available and when it is not available, and a rechargeable battery having a pair of terminals and by which the load can be energized at times when alternating current is not available from said source, said electrical system being characterized by:

A. the alternating current source comprising a single winding having only two terminals that has one of its terminals grounded to a terminal of the battery and to a terminal of the load;

B. first half-wave rectifier means connected with the ungrounded terminal of the winding;

C. means for connecting said first rectifier means with the ungrounded terminal of the load so that the load can be energized with current of one polarity that flows in the winding;

D. second half-wave rectifier means connected with said ungrounded terminal of the winding and with the ungrounded terminal of the battery and arranged for passing to the battery current of the other polarity that flows in the winding; and E. switch means for selectively establishing and opening a connection between the ungrounded terminal of the load and the ungrounded terminal of the battery to provide for energization of the load from the battery.

5. The electrical system of claim 4, further characterized by:

F. voltage regulator means operatively associated with said second rectifier means and connected with the winding and the battery for regulating the flow of current through said second rectifier means in accordance with the state of charge of the battery.

6. An electrical system of the type comprising a source of alternating current, a storage battery, and a load alternatively energizable from the alternating current source or the battery, characterized by:

A. the alternating current source having only two terminals;

B. first half-wave rectifier means connected for cooperation with the alternating current source and the battery and arranged to pass to the battery, for charging the same, only half-cycles of the alternating current from said source that are of one polarity; and C. second half-wave rectifier means connected for cooperation with the alternating current source and the load and arranged for energizing the load with only half-cycles of the other polarity of alternating current from said source.

* * * * *